United States Patent [19]

Yonechi et al.

[11] Patent Number: 4,966,434

[45] Date of Patent: Oct. 30, 1990

[54] OPTICAL FIBER CABLE

[75] Inventors: Shinichi Yonechi, Yokohama; Yukinori Ishida; Masaaki Kawase, both of Ibaraki, all of Japan

[73] Assignees: Sumitomo Electric Industries, Ltd., Osaka; Nippon Telegraph and Telephone Public Corporation, Tokyo, both of Japan

[21] Appl. No.: 642,820

[22] Filed: Aug. 21, 1984

[30] Foreign Application Priority Data

Aug. 23, 1983 [JP] Japan ............................ 58-154263

[51] Int. Cl.⁵ .............................................. G02B 6/44
[52] U.S. Cl. ............................................. 350/96.23
[58] Field of Search ................................... 350/96.23

[56] References Cited

U.S. PATENT DOCUMENTS

| | | | |
|---|---|---|---|
| 3,660,590 | 5/1972 | Conant | 350/96.23 |
| 3,916,078 | 10/1975 | Priaroggia | 174/10 |
| 4,009,932 | 3/1977 | Ferrentino | 350/96 B |
| 4,093,342 | 6/1978 | Foord et al. | 350/96.23 |
| 4,153,332 | 5/1979 | Longoni | 350/96.23 |
| 4,359,598 | 11/1982 | Dey et al. | 350/96.23 |
| 4,375,313 | 3/1983 | Anderson et al. | 350/96.23 |
| 4,381,140 | 4/1983 | van der Hock et al. | 350/96.23 |

FOREIGN PATENT DOCUMENTS

| | | | |
|---|---|---|---|
| 56550 | 5/1977 | Japan | 350/96.23 |
| 85706 | 7/1981 | Japan | 350/96.23 |

Primary Examiner—William L. Sikes
Assistant Examiner—Robert E. Wise
Attorney, Agent, or Firm—Cushman, Darby & Cushman

[57] ABSTRACT

An optical fiber cable comprising a core which comprises at least two filaments stranded, at least one optical fiber stranded around the core and a jacket around the optical fiber, wherein the strand pitch of the filaments of the core is greater than that of the optical fiber, in which the optical fiber contained is free from elongation strain when the cable is stretched.

6 Claims, 2 Drawing Sheets

A

B

OPTICAL FIBER CABLE

FIELD OF THE INVENTION

The present invention relates to an optical fiber cable. More particularly, it relates to an optical fiber cable in which an optical fiber assembled does not suffer from elongation strain even when the cable is forced to stretch by external force in its longitudinal direction.

BACKGROUND OF THE INVENTION

Remarkable progress has been made in an optical fiber cable as a new communication medium, and numerous cable structures have been proposed and utilized.

In the optical fiber cables, it is important to protect optical fibers assembled in the cable against an external force, since optical fibers have a drawback that when deformed upon application of an external force, they tend to be broken, and/or attenuation therethrough increases. To overcome these drawbacks of the optical fibers, several cable structures have been proposed. Among them, one cable structure has a buffer material provided around the optical fibers for protecting them against the external force or pressure. The other cable structure has a hard shell in which the optical fibers are contained.

In order to stand against tensile stress applied to the cable, a highly tensile filament, so-called a tension member, is assembled in the cable to prevent stretching of the whole cable, and thereby the tensile stress is not exerted on the optical fibers. Even if the optical fiber cable contains the tension member, it can be stretched and, therefore, the optical fibers contained in the cable are also stretched to nearly the same extent as in the cable. Since the optical fiber cable is likely to be subjected to a large tensile stress, for example, during installation of the cable, a considerably thick tension member is inevitably required, which results in an increase of the diameter and weight of the cable. Therefore, the preferred properties of the optical fiber such as light weight, a small diameter and flexibility are undesirably deteriorated.

It is known that if the residual set is present in the optical fiber, time required until the optical fiber is broken (breaking time) is shortened. This is the reason why the conventional optical fiber cables are made so that they are not easily stretched in order to avoid the application of elongation strain on the optical fibers contained in the cable.

SUMMARY OF THE INVENTION

An object of the present invention is to provide an optical fiber cable having a structure that even if the cable is stretched, the optical fibers contained therein do not suffer from elongation strain.

Accordingly, the present invention provides an optical fiber cable comprising a core which comprises at least two filaments stranded, at least one optical fiber stranded around the core and a jacket around the optical fiber, wherein the strand pitch of the filaments of the core is greater than that of the optical fiber.

DETAILED DESCRIPTION OF THE INVENTION

In the present invention, the optical fiber is helically wound on the core so that when the whole cable is stretched, a reduction in the radius of the core is greater than that in the radius of the helix of the optical fiber. Due to such configuration of the core and the optical fiber, the tension applied to the optical fiber is not increased when the cable is stretched. The core comprises at least two filaments, preferably at least four, more preferably at least six. In some applications, the core may contain more that eight filaments. The number of the optical fiber to be assembled depends on the end use of the optical fiber cable.

In the present invention, it is essential for the cable to have a core which considerably shrinks in radial direction when the whole cable is stretched. This is achieved by the core comprising filament of a stranded structure having a strand pitch greater than that of the helically wound optical fiber.

Usually, the pitch of the helically stranded optical fiber is from 5 to 30 cm, preferably from 10 to 20 cm. The pitch of the stranded filament of the core is greater than that of the optical fiber by from 10 to 40 cm, preferably by from 15 to 35 cm.

The present invention will be hereinafter explained further in detail by making reference to the accompanying drawings.

Figure 1:
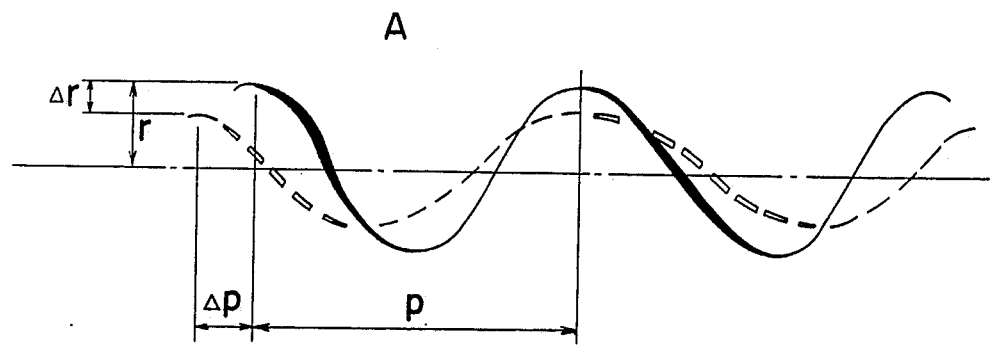
FIG. 1A is a figure illustrating the principle of the present invention.
FIG. 1B is a graph showing analytical results as obtained mathematically.
Figure 1:
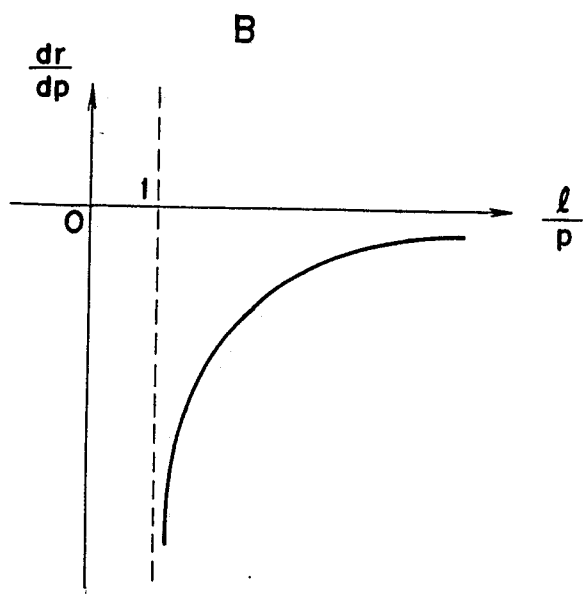

FIGS. 1A and 1B illustrate the principle applied to the present invention.

A helix (radius: r; pitch: p) as shown in FIG. 1A is stretched in the axial direction by $\Delta p$. In this stretched condition, it has a form as indicated by the dotted line. A change in the radius can be represented by:

$$\Delta r = \frac{dr}{dp} \Delta p$$

Thus a degree of change can be represented by:

$$\frac{dr}{dp} = \frac{-1}{2\pi \sqrt{\left(\frac{1}{p}\right)^2 - 1}}$$

In FIG. 1B, dr/dp is plotted against a ratio (1/p) of a length (1) of a line per pitch to a pitch (p). When the line is not stranded, the pitch is infinite, and the ratio 1/p is 1 (one). When the radius r is constant, the 1/p decreases as is p increases. As apparent from the graph of FIG. 1B, the smaller the ratio 1/p, the larger the degree of reduction in the radius. In other words, the more loosely the filament is stranded and thus, the larger the pitch of filament, the greater the shrinkage in the radial direction on stretching.

This principle is applied to the present invention. That is, the core of the present invention has a stranded structure of the filaments with a longer pitch than that of the optical fiber.

Figure 2:
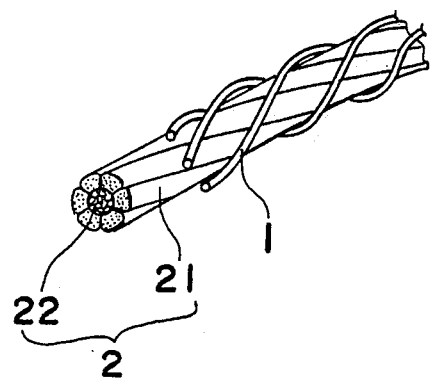
FIG. 2 is a schematic view of the fundamental structure of the optical fiber cable of the present invention.

FIG. 2 is a schematic view illustrating the fundamental structure of the optical fiber cable of the present invention.

Numeral 1 denotes an optical fiber, which is usually provided with a plastic coating. A plurality of, for example, three optical fibers 1 are helically stranded around a core 2. The core 2 is of a stranded structure as described above. For example, a preferred core comprises a plurality of, for example, six high tensile filaments 21 helically stranded around a cushioning member 22. The cushioning member 22 is made of a material which, upon stretching of the core 2, permits the filaments 21 to move in the radial direction and thus the radius of the core 2 to reduce. Preferably, the cushioning member is made of a sponge-like material, woolen yarn-like material, etc.

If the core 2 does not include any cushioning member, the filaments 21 do not move and thus the core 2 does not shrink in the radial direction. Therefore, the elongation strain in the optical fibers 1 is not sufficiently prevented. In the structure shown in FIG. 2, the strand pitch of the filaments 21 is greater than that of the optical fibers 1. When the whole cable is stretched in the longitudinal direction, a reduction in the radius of the core 2 is, therefore, greater than that in the radius of the helix of the optical fibers 1. This can be understood from FIG. 1. Thus, the tension applied to the optical fibers is not increased; rather, when the tension remains in the optical fibers, it is likely to be reduced and relieved.

Figure 3:
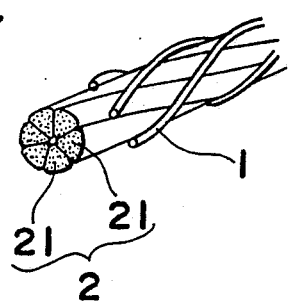
FIGS. 3 and 4 are each a schematic view of another embodiment of the optical fiber cable of the present invention.

FIG. 3 is a schematic view of another embodiment of the optical fiber cable of the present invention.

A core 2 is fabricated by stranding a plurality of high tensile filaments 21. This core 2, however, can be fabricated by stranding a plurality of cushioning materials alone or materials having both cushioning property and high tensile property, such as Kevlar (trade name) fiber alone in place of the high tensile filaments 21.

Also in this case, the strand pitch of the core should be greater than that of the optical fibers.

Figure 4:
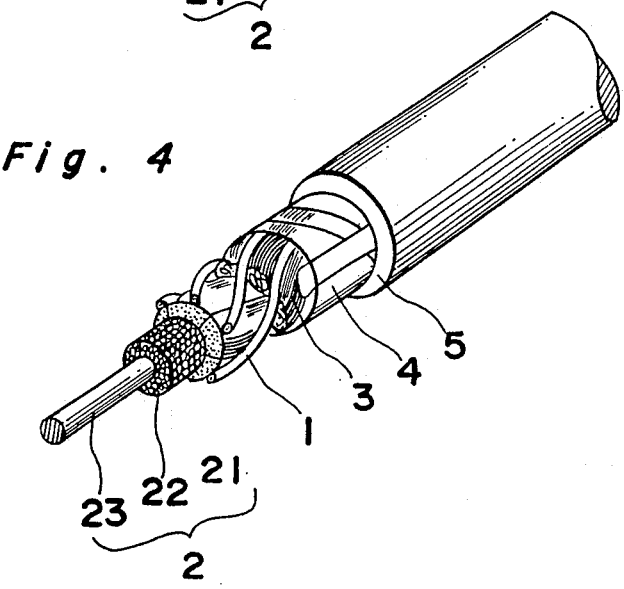

FIG. 4 is a schematic view of further embodiment of the optical fiber cable of the present invention.

A core 2 comprises high tensile filaments 21, a cushioning material 22, and a central tension member 23. The central tension member 23 and the cushioning material 22 may not be stranded. A plurality of high tensile filaments 21 are stranded at a greater pitch than that of optical fibers 1.

As described above, the core 2 can be fabricated in combination with the central tension member 23. In such the case, the double effects can be expected; that is, the central tension member prevents the cable from being stretched and, even if the cable is stretched, the optical fibers 1 are free from elongation strain.

Clearances among the optical fibers 1 are filled with a filling material 3. A tape 4 is wound around the filling material 3, which is then covered with a sheath 5, namely jacket. Preferably, the central tension member 23 is a steel wire or FRP (fiber reinforced plastics), the cushioning material 22 is a sponge-like plastic foam, the high tensile filaments are Kevlar (trade name) fibers, the packing material 3 is a plastic yarn, the tape winding layer 4 is a plastic tape, and the sheath 5 is made of polyethylene or PVC.

In FIGS. 2 and 3, layers surrounding the optical fibers such as a tape layer, a sheath layer and so on are not illustrated. Needless to say, the ultimate cable is produced by providing a tape winding layer and a sheath as in FIG. 4.

In the above-described embodiment, the direction in which the core 2 is stranded is different from that in which the optical fibers 1 are stranded. However, they may be stranded in the same direction.

What is claimed is:

1. An optical fiber cable comprising:
   a core which includes a plurality of filaments which are stranded at a first definite pitch;
   at least one optical fiber stranded around the core at a second definite pitch which is a shorter pitch than the first definite pitch; and
   a jacket surrounding the optical fiber.

2. An optical fiber cable as claimed in claim 1, wherein the core further includes a cushioning member and wherein said plurality of filaments includes at least two high tensile filaments stranded around the cushioning member.

3. An optical fiber cable as claimed in claim 1, wherein the core comprises a central tension member, and a cushioning member placed around the central tension member, and wherein said plurality of filaments includes at least two high tensile filaments stranded around the cushioning member.

4. An optical fiber cable as claimed in claim 1, wherein the second definite pitch of the helically stranded optical fiber is from 5 to 30 cm, and the first definite pitch of the stranded filament of the core is greater than that of the optical fiber by from 10 to 40 cm.

5. An optical fiber cable comprising:
   filament means for withstanding tensile stress and for decreasing in radius at a first definite rate of radius decrease per unit length of stretch when tensile stress is applied thereto, said filament means including a plurality of filament structures wound so as to have a first definite pitch;
   optical fiber means, stranded around said filament means, for carrying an optical signal, and for decreasing in radius at a second definite rate of radius decrease per unit length of stretch which second rate is a lower rate than said first definite rate, when tensile stress is applied thereto, said optical fiber means including at least one fiber structure wound with a second definite pitch which is a pitch of a smaller distance than said first definite pitch; and
   means for jacketing said optical fiber cable.

6. An optical fiber cable as in claim 5 further comprising cushioning means, around which said filament structures are wound, for cushioning said filament means as said radius decreases.

* * * * *